United States Patent Office 3,387,083
Patented June 4, 1968

3,387,083
PAY TELEVISION SYSTEM WITH BILLING TRANSPONDER
Richard J. Farber, New Hyde Park, and Francis H. Boos, Jr., Great Neck, N.Y., assignors to Hazeltine Research, Inc., a corporation of Illinois
Filed Dec. 23, 1963, Ser. No. 332,681
14 Claims. (Cl. 178—6)

ABSTRACT OF THE DISCLOSURE

A pay television system having a transmitter which supplies one or more television signals and a plurality of interrogation signals individually coded to correspond to a single one of a plurality of receivers. In response to its unique interrogation signal each receiver sends back to the transmitter a signal indicative of the desire to receive a particular program. The transmitter compares these signals with their respective interrogation signals and for each correlation transmits a second signal to the corresponding receiver which permits reception of the desired program signal. Each correlation is also recorded for billing purposes and the signals indicative of a desire to receive a program are accumulated in order to provide audience interest information. Alternative arrangements are also covered.

---

The present invention relates to a new and improved pay television system. In particular it relates to a pay television system which utilizes a new and improved audience survey system performing such useful functions as, for example, obtaining billing requirements and customer usage of pay television channels.

In pay television systems of the type contemplated by the present invention, it has heretofore been customary to provide adapters at the receivers for such purposes as accepting the program payment and recording certain statistical information by use of a recording device located within the adapter. Regarding the accepting of program payment, this is done either by the subscriber's depositing the required coins in a coin collecting device in the adapter, which devices are then periodically collected by transmitter station personnel, or in the case of a credit subscriber, by the subscriber's pushing of a button on the adapter, thus indicating his willingness to have the program charge billed to his monthly account. Either of these actions by a subscriber causes a recording to be made in the adapter. This recording indicates the payment made or the desire to accept the future charge billing. By means of timing pulses sent out from the transmitter and recorded on the tape, the tape of the payment recording also indicates the program selected by the subscriber. In either case, once the program charge has been acknowledged by the appropriate payment function, an interlock device in the adapter permits the previously inhibited pay television program to be fed to the receiver and the program is thereupon presented in the usual manner.

A pay television system of this type is described in Electronics magazine, Aug. 19, 1960, in an article entitled "How a Closed Circuit Pay TV System Works," page 49, et seq.

In addition to the function of preventing reproduction of the pay program until the appropriate program charge acknowledgment has been made, it is also necessary to provide a record of certain statistical information relating to the subscriber's reception of the pay program. These are, for example, the amount of money deposited in a coin device or the charge accepted by the credit subscriber, and the date and time of program received. Other information may be necessary, but the foregoing will be sufficient for the purposes of this explanation. This information is needed by the transmitting station not only to indicate how much money is forthcoming, for the month's programs, but also to provide an indication of the popularity of any given program. For this latter reason it is desirable to have the information as to the number of viewers, as quickly as possible, ideally, at the same time as the presentation of the program. However, when the information is recorded in the respective adapters, at each receiver, it is not practical to obtain this information until the periodic collection is made, which, in some cases, might be as much as a month after the program was presented. For this reason, it is desirable to obtain this information at some central information storage location, which, for example, may be at the central transmitting station.

It is therefore, an object of the present invention to provide a new and improved pay television system.

It is another object of this invention to provide in a pay television system a new and improved audience survey system which facilitates the billing of credit customers.

A further object of this invention is to provide in a pay television system a new and improved audience survey system which indicates pay television channel usage, during the broadcast of pay television programs.

Still another object of this invention is to provide customer adapters which enable reproduction of a pay television program upon reception of a signal which indicates system recognition that a proper program payment acknowledgment has been made by a customer.

In accordance with the present invention, a pay television system comprises signal source means for supplying a television signal and for supplying a plurality of interrogation signals and payment acknowledgment reply signals individually coded to correspond to a single one of the following receiving means. The system also comprises a plurality of receiving means each for enabling reproduction of a television program from the supplied television signal in response to an individual one of the payment acknowledgment reply signals. The plurality of receiving means includes means responsive to an individual one of the interrogation signals for sending back to the first means a signal representative of a program payment acknowledgment and of the program corresponding thereto. The system additionally comprises coupling means for intercoupling the signal source means and a plurality of receiving means.

In accordance with another feature of the present invention there is presented an audience survey system for a pay television system of the type in which a television signal is supplied to a plurality of receiving stations. The survey system comprises first means for supplying a plurality of interrogation signals and payment acknowledgement reply signals each individually coded to correspond to a single one of the receiving stations. The survey system additionally comprises means in each receiving station individually responsive to its respective interrogation signal for sending back to the first means a signal representative of a program payment acknowledgment and of the program corresponding thereto. In addition, the system comprises means in each receiving station individually responsive to its respective payment acknowledgement reply signal for enabling reception of the television signal by the receiving station and coupling means for intercoupling the first means with the means in each receiving station.

In accordance with another feature of the present invention there is presented control apparatus for use in a receiving station of a pay television system. The control apparatus comprises means for receiving a plurality of coded interrogation signals and payment acknowledgement replay signals and for selecting one each of these signals. The apparatus additionally comprises means responsive to the selected interrogation signal, and a program payment acknowledgment made by a viewer, for sending out a signal representative of the program payment acknowledgment and of the program corresponding thereto. The control apparatus also comprises means responsive to the selected payment acknowledgment reply signal for enabling reproduction of a received pay television program.

For a better understanding of the present invention together with other and further objects thereof, reference is had to the following description taken in connection with the accompanying drawings, and its scope will be pointed out in the appended claims.

Referring to the drawings.

Figure 1A:
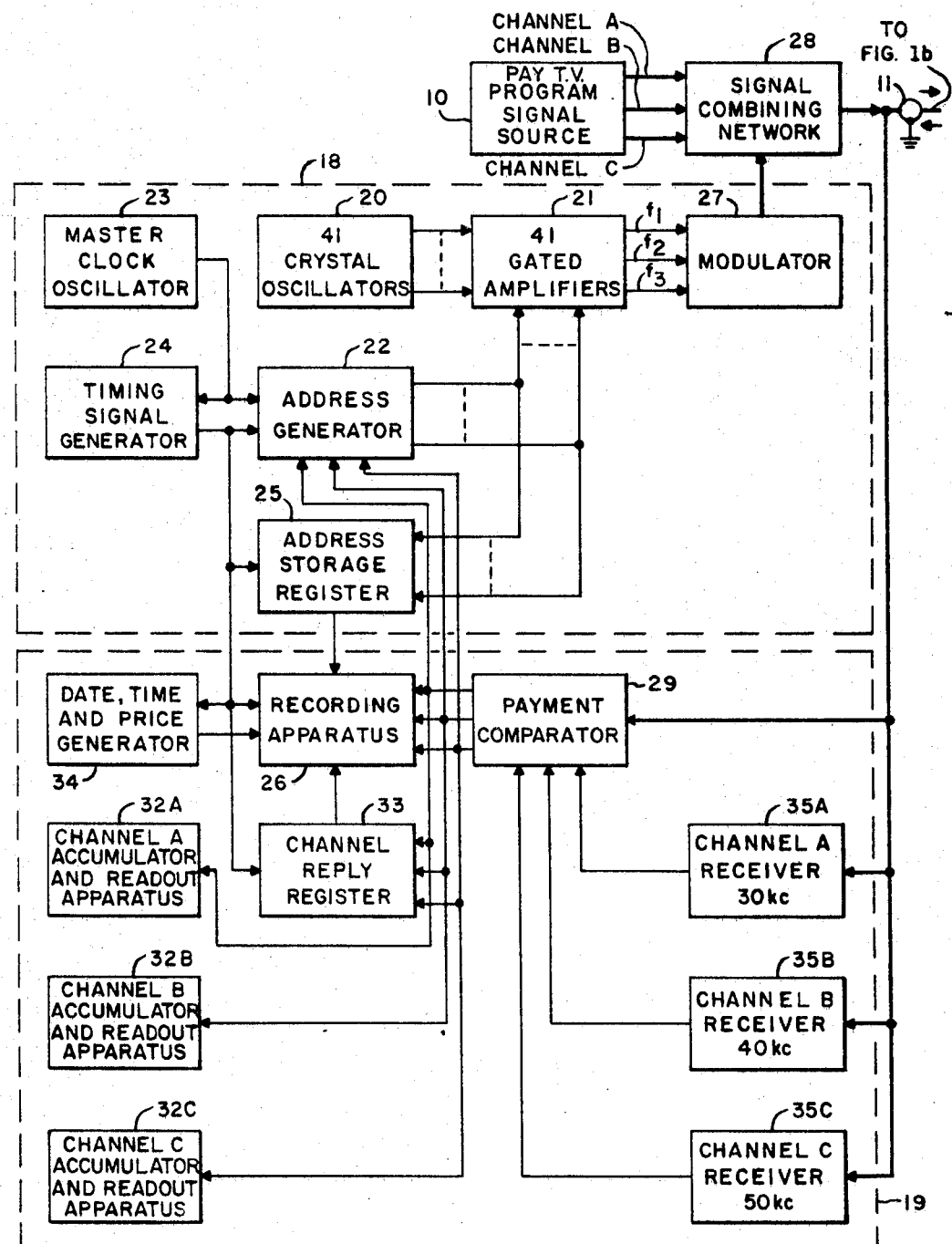
FIGS. 1a and 1b are block diagrams of one preferred example of a pay television system constructed in accordance with the present invention.
Figure 1B:
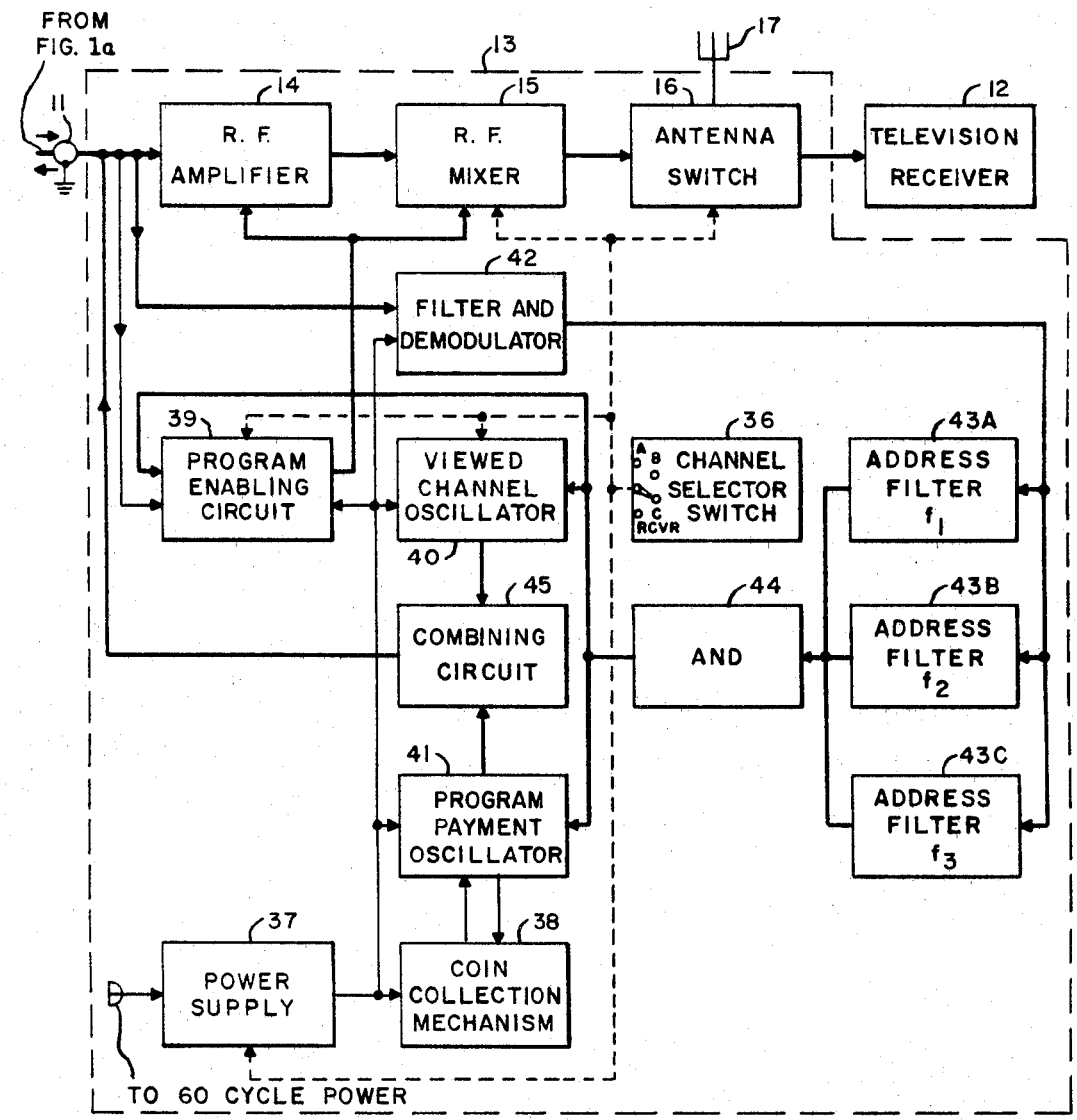

In the system of FIGS. 1a and 1b a pay television program signal source 10 preferably simultaneously supplies a number of pay program offerings, for example, those corresponding to pay channels A, B, and C, by a coupling means such as coaxial cable system 11 to a plurality of receiving stations, one of which is shown in the figure. Each receiving station comprises control apparatus 13 which is constructed in accordance with the present invention and described more fully below. Briefly however, apparatus 13 comprises means for enabling reproduction of a television program from a supplied television signal. When enabling such reproduction the supplied television signal is coupled from apparatus 13 to the input terminals of a conventional unmodified TV receiver 12.

Each offering presented on channel A, B, or C preferably occupies a bandwidth larger than the conventional 6 mc. bandwidth and is modulated on a carrier frequency chosen so that all three program signals lie in the frequency spectrum from 10 to 40 mc. The additional bandwidth is used on the vestigial sideband side to reduce phase distortion near the carrier frequency and thus improve transient response. However, the modulation components of program signals A, B, and C, appear, with respect to their individual carriers, in an order inverse to that found in a signal which conforms exactly to Federal Communications Commission (FCC) standards as found in part 3 of the FCC rules.

One of these program signals is selected by a customer in a manner more fully described below and is amplified by an RF amplifier 14 and applied to an RF mixer 15 which modulates the program signal up the frequency spectrum to an RF carrier which may correspond to that used for standard television channels 5 or 6. The choice of either the channel 5 or 6 RF carrier is based solely on which channel is not commercially used in the area in which the receiving station is located. The mixer 15 output is applied to the antenna input terminals of receiver 12 through an antenna switch 16 described more fully below with reference to apparatus 13. However, in brief, switch 16 either connects mixer 15 output to the receiver, or else, connects the subscriber's antenna 17 to the receiver. In the former case the receiver 12 in a well-known manner reproduces the pay program offering.

Three important features of the pay television system shown in FIGS. 1a and 1b comprise in combination an audience survey system constructed in accordance with the present invention. These features are the novel customer interrogation apparatus 18, the novel customer-survey and billing apparatus 19, and the aforementioned novel receiving station control apparatus 13. In accordance with the invention, interrogation apparatus 18 supplies to the receiving station in the system a plurality of interrogation signals each of which is coded to correspond to a single receiving station. In a manner more fully described below, each station apparatus 13 in response to its own interrogation signal transmits to the survey and billing apparatus 19 a signal which is representative of a customer program payment acknowledgement and of the program to which this acknowledgement corresponds. When the proper signal is received by apparatus 19 apparatus 18 is activated to supply a payment acknowledgement reply signal to the responding receiving station. This signal is used by the control apparatus 13 in a manner more fully described below to activate RF amplifier 14 and RF mixer 15 so that the pay program may be coupled to the subscriber's receiver 12. The information which is represented by the signal received by apparatus 19 is used to produce customer billing requirements, as well as, to produce useful customer program interest information while the pay programs are viewed.

In a preferred form of the present invention, each receiving station in the system is given a coded address which is made up of three discrete frequencies chosen from forty-one discrete frequencies separated by three (3) kc. intervals and lying in a band from 600 to 730 kc. Ten thousand unique subscriber codes can be derived from forty-one frequencies which are generated and amplified by forty-one crystal oscillators 20 and forty-one gated amplifiers 21, respectively. An address generator 22 is a storage matrix which translates stored decimal coded addresses into the frequency-coded form, by energizing in a predetermined sequence, amplifiers 21, three at a time.

Proper timing of the interrogation sequence is obtained by use of a master clock oscillator 23 and a timing signal generator 24. The energization of each combination of three amplifiers 21 occurs for 3 milliseconds. There is also a 3 millisecond delay between successive operation of each combination of three amplifiers to allow time for a customer acknowledgment signal to be received.

During each 6 millisecond period described above the address selected is stored in an address storage register 25 and under conditions described below a permanent record of this address is recorded and stored by a recording apparatus 26 which may be for example, a high-speed punched paper tape. At the end of each 6 millisecond period if no customer acknowledgment is received the register 25 is cleared by a signal from timing generator 24.

The first generation of a unique combination of three frequencies, $f_1$, $f_2$ and $f_3$ constitutes an interrogation signal which then modulates a carrier frequency of for example, 8 mc. in modulator 27. The output of modulator 27 is added to the program signals for channels A, B, and C in signal combining network 28 for transmission on the coupling means for intercoupling apparatus 18 and 19 with apparatus 13. Such coupling means may be for example, coaxial cable system 11. However, it is to be appreciated that the ouput of modulator 27 may be transmitted to a receiving station by radiation from an antenna.

In response to the interrogation signal which represents its own address, control apparatus 13, in a manner described below, may send by cable system 11 to survey and billing apparatus 19, a signal representative of a program payment acknowledgment and the program corresponding thereto. Moreover, this response preferably occurs during the 6 millisecond interval described above. In one form of the invention this signal is applied to a payment comparator 29, which may have the form shown in FIG. 2a or FIG. 2b.

Figure 2A:
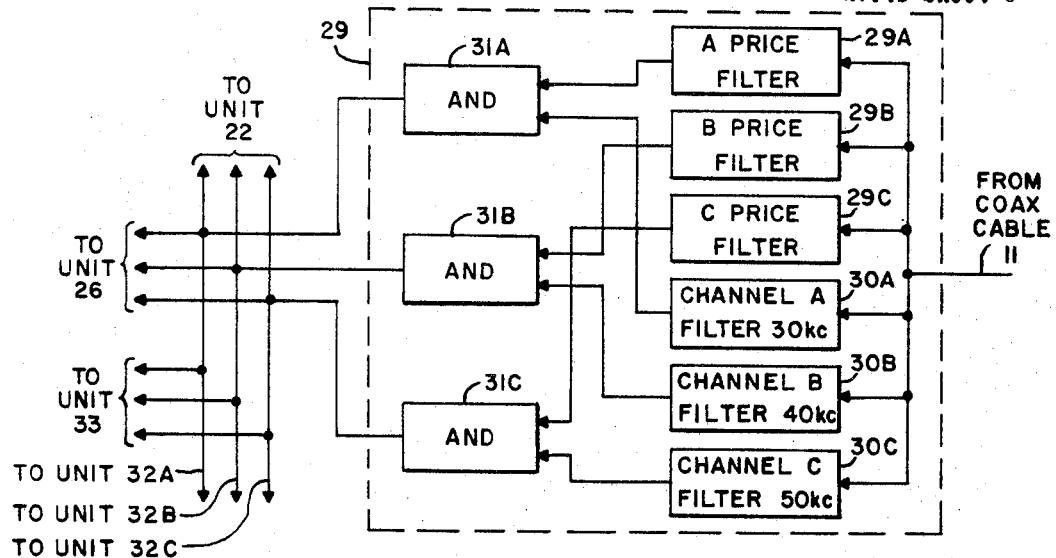
FIGS. 2a and 2b show in block diagram form typical embodiments of a payment comparator used in the pay television system of FIG. 1.

As shown in FIG. 2a, there are three price filters, 29A, 29B, and 29C, which correspond respectively to program channels A, B, and C. Each filter can be tuned to one of a number of discrete frequencies each one of which frequencies corresponds to the payment required for the program then being offered on the channel in question.

A typical frequency band used may be from 60 to 90 kc. Channel filters 30A, 30B, and 30C correspond to program channels A, B, and C, and may be designed to pass the frequencies 30, 40 and 50 kc., respectively. The choice of these frequencies is discussed below with reference to control apparatus 13. However, the price filter 29A and channel filter 30A are then coupled to an AND gate 31A. Similar connections are made to AND gates 31B and 31C for channels B and C, respectively. Only the simultaneous presence of the proper combination of payment acknowledgment signal and channel representative signal can activate one of the gates 31A, 31B, or 31C.

Each gate 31A, 31B, and 31C is coupled to the address generator 22. A payment acknowledgment reply signal is produced when one of the gates 31A, 31B, or 31C activates the generator 22 during the 6 millisecond interval. At the end of the 6 millisecond interval, the generator 22 energizes the three amplifier combination previously chosen to produce an interrogation signal. The repeated three frequency signal constitutes a payment acknowledgment reply signal which is closely spaced in time to the interrogation signal and which occurs in a time substantially less than the one minute interrogation sequence period. In a manner described below this reply signal makes possible the operation of amplifier 14 and mixer 15 so that a pay program may be reproduced by receiver 12.

The outputs of gates 31A, 31B and 31C are coupled, respectively, to channel accumulator and readout apparatus 32A, 32B, and 32C, which count the number of responses received from the gates 31A, 31B, and 31C and additionally provide a visual display of the totals accumulated. This display provides a convenient method of assessing customer interest in current program offerings.

The outputs of gates 31A, 31B and 31C are also connected to recording apparatus 26 and channel reply register 33. The register 33 translates a gate output signal to a form which can be recorded by apparatus 26. At the same time a gate circuit output activates the recording apparatus 26 so that the address then stored in register 25 and the channel reply stored in register 33 may be recorded. At the end of each 6 millisecond period, the register 33 is cleared by a timing signal from generator 24. Moreover, at the start of each complete interrogation cycle timing signal generator 24 activates a date, time and price generator 34 which produces signals representative of the date, time and price of the current program offerings. These signals may be for example, coded pulse trains. The information represented by these signals is recorded on the storage element of apparatus 26. The total of information recorded by apparatus 26 is useful to obtain customer billing requirements.

Figure 2B:
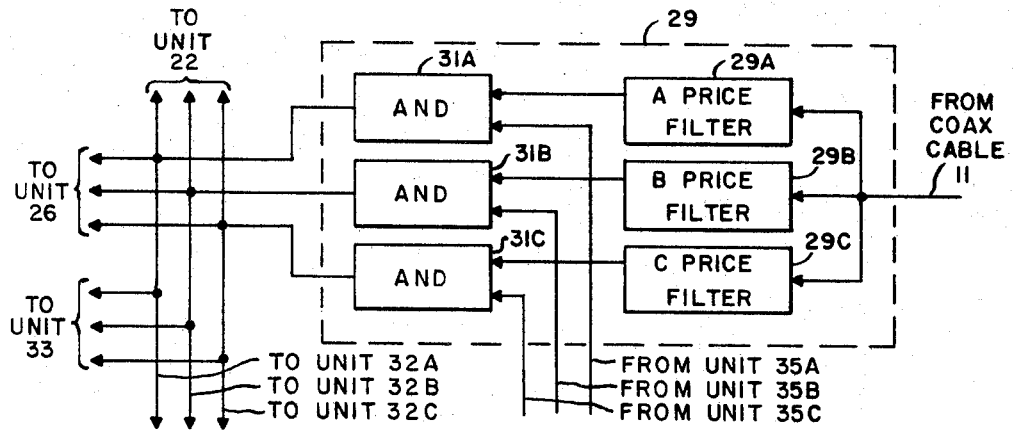

Another embodiment of survey apparatus 19 uses the payment comparator 29, shown in FIG. 2b and channel A, B, and C receivers, 35A, 35B and 35C, respectively. The receivers 35A, 35B and 35C, which may contain one or more stages of amplification, function in a manner similar to channel filters 30A, 30B, and 30C shown in FIG. 2a in that the receivers pass 30, 40 and 50 kc. tones, respectively. These tones, as described above, correspond to channels A, B, and C, respectively. FIG. 2b contains price filters 29A, 29B and 29C and AND gates 31A, 31B, and 31C whose connections and operations are described with reference to FIG. 2a.

Turning at this point to novel control apparatus 13 for enabling reproduction of a pay television program from a supplied television signal constructed in accordance with the present invention, one component thereof is a channel selector switch 36. Switch 36 has positions corresponding to the available pay program channels A, B and C, and a RCVR position. Operation of this switch 36 to any channel position connects mixer 15 output terminals through antenna switch 16 to receiver 12. Operation of switch 36 to the RCVR position disconnects the mixer 15 and connects antenna 17 through switch 16 to receiver 12.

Operation of switch 36 to any pay channel position completes the connections between a power supply 37 and a coin collection mechanism 38, a program enabling circuit 39, a viewed channel oscillator 40, a program payment oscillator 41 and the active stages of filter and demodulator circuit 42. In addition operation of switch 36 mechanically selects an RF carrier frequency in the oscillator circuits of mixer 15 circuit and also one of the frequencies of oscillation in viewed channel oscillator 40. These latter frequencies may be for example, 30, 40 or 50 kc., respectively, corresponding to channels A, B, and C.

Before a program can be viewed at a receiving station whose control apparatus 13 includes a coin mechanism 38, the proper payment acknowledgment for it must be made by a viewer, such as for example by depositing money in coin mechanism 38. This mechanism may be arranged to accept only one currency unit, for example, a 25 cent coin. A stepping switch in mechanism 38 is connected to a variable tuning element in oscillator 41 which may be tuned by the switch to one frequency lying for example in the band from 60 to 90 kc. Each coin deposited moves the stepping switch one position, causing a like change in the operating frequency from oscillator 41. Such a frequency selected represents the total number of currency units deposited. Thus, selection of a pay channel by use of switch 36 and appropriate payment to mechanism 38 determines the output frequency value of oscillators 40 and 41 output signals.

Before considering the manner in which oscillators 40 and 41 are energized, it is to be noted that coin mechanisms 38 are not required for those customers who wish to purchase programs on a credit basis. Instead of mechanism 38, some other means for making a payment acknowledgment, such as a switch which enables oscillator 41 to operate at some predetermined frequency, may be provided. If all credit customers are connected to one interrogation and survey apparatus 18, and 19, respectively, and cash customers to another, then the predetermined frequency can be the same for all the customers who subscribe on a credit basis. In the credit customer case, payment comparator 29, price filters are tuned to the aforesaid predetermined frequency. Operation of the audience survey system remains the same in all other respects.

Now, to be considered is the manner in which oscillators 40 and 41 are energized. As described above, a plurality of interrogation signals, each individually coded to correspond to a receiving station address are supplied by a coupling means such as cable system 11 to the receiving stations in the system. These interrogation signals are encoded in apparatus 18 on, for example, an 8 mc. carrier. The resulting signal is coupled from cable system 11 to a filter and demodulator network 42 which may contain one or more stages of amplification. The output of network 42 is coupled to address filters 43A, 43B, and 43C, which respond to one unique combination of frequencies, for example, frequencies $f_1$, $f_2$ and $f_3$, which combination constitutes the address of the receiving station in question.

The filter 43A, 43B, and 43C outputs are coupled to an AND gate 44 which is enabled only when frequencies $f_1$, $f_2$ and $f_3$ are simultaneously present. The output of gate 44 produced in response to a selected interrogation signal energizes oscillators 40 and 41 whose outputs are added in a combining circuit 45 and then transmitted to survey apparatus 19 on cable system 11. The oscillator 41 has an electronic switch which is activated after the receipt of an interrogation signal to reset the aforementioned stepping switch in mechanism 38 to a zero position. With the stepping switch at zero, the oscillator is completely detuned and can have no output.

As described above apparatus 18 and 19 jointly act to supply a payment acknowledgment reply signal to an interrogated receiving station when that station has returned to the apparatus 19 a signal representative of a proper program payment acknowledgment and of the program corresponding thereto. Such a payment acknowledgment reply signal may be a repetition of the three frequency address code, for example, frequencies $f_1$, $f_2$ and $f_3$, which is received as described above, at the control apparatus in a period of time no longer than 9 milliseconds after the interrogation signal is received.

Figure 3:
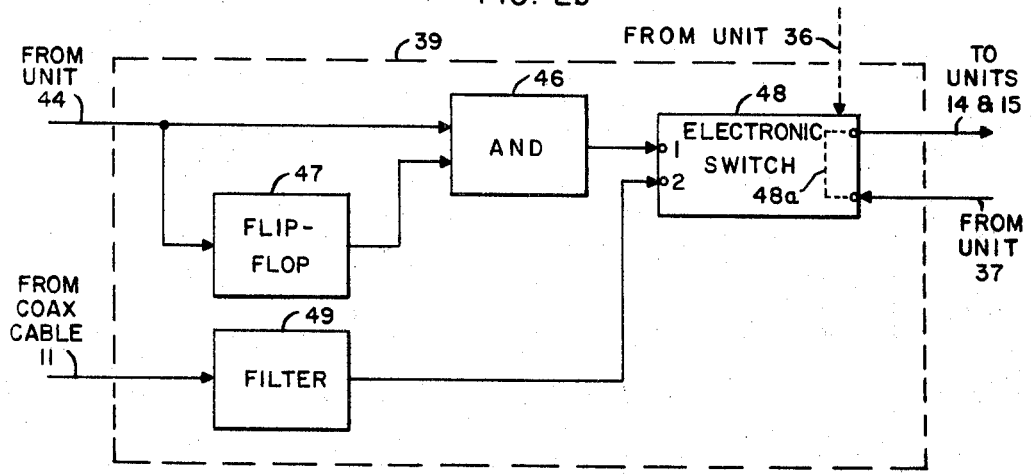
FIG. 3 is a block diagram of a program enabling circuit used in the system of FIG. 1.

As shown in FIG. 1b, the output of AND gate 44 is also coupled to a program enabling circuit 39 which may have the form as shown in FIG. 3. In this figure the output of AND gate 44 is coupled to another AND gate 46 and to a flip-flop network 47 whose input circuit comprises a network which delays the operation of the flip-flop for a period of time equal to the duration of an interrogation signal interval, for example, 6 milliseconds. The flip-flop output is coupled to gate 46 and has a pulse width greater than or equal to the interrogation signal interval, for example, 6 milliseconds. As a result, flip-flop 47 output is present at gate 46 only when the output from gate 44 corresponds to a received payment acknowledgment reply signal. This condition enables gate 46 whose output is coupled to terminal 1 of an electronic switch 48. An input at this terminal "makes" switch 48 connection 48A, thereby connecting power supply 37 to and so energizing amplifier 14 and mixer 15.

At the end of a program, to restore amplifier 14 and mixer 15 to an inoperative condition until a payment is made for the next program offering to be viewed, a pilot signal of for example 10 kc. may be generated by program signal source 10 and supplied to the receiving stations. This pilot signal may be coupled from cable system 11 to the program enabling circuit 39, filter 49 thence to terminal 2 of electronic switch 48. An input at this terminal "breaks" connection 48A. In addition, selector switch 36 may be so arranged that any change in a switch position while a pay program is viewed also "breaks" connection 48A thus preventing unauthorized use of pay programs.

It is to be appreciated that the components of a pay television system herein described with reference to FIGS. 1a, 1b, 2a, 2b and 3 are of conventional construction and well known to those skilled in the broadcast and communications arts.

In the preferred embodiment of the present invention transmission of all signals takes place via coaxial cable 11. However it will be obvious to those skilled in the art that the transmission of audience survey system signals may be by other well-known means such as radiation from antennas. Moreover, although not explicitly shown, cable 11 includes all the necessary, well-known amplification, equalization and distribution networks required to achieve proper signal transmission. Although the pay television system of FIGS. 1a and 1b has been described for the case in which program source 10, interrogation apparatus 18 and survey and billing apparatus 19 are at the same location, it is to be understood that the source 10 may be at a different location from one or more embodiments of apparatus 18 and 19.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A pay television system comprising:
signal source means for supplying a television signal and for supplying a plurality of interrogation signals and, in response to program payment acknowledgment signals from a plurality of receiving means, payment acknowledgment reply signals individually coded to correspond to a signal one of the following receiving means;
a plurality of receiving means each for enabling reproduction of a television program from said supplied television signal in response to an individual one of said payment acknowledgment reply signals, said plurality of receiving means including means responsive to an individual one of said interrogation signals for sending back to said first means a signal representative of a program payment acknowledgment and of the program corresponding thereto;
and coupling means for intercoupling said signal source means and said plurality of receiving means.

2. A pay television system constructed in accordance with claim 1 in which which each of said receiving means further includes a television receiver for reproducing a pay television program from said supplied television signal.

3. A pay television system constructed in accordance with claim 1 in which said coupling means comprises an interconnecting cable system and also in which each of said plurality of receiving means includes apparatus responsive to said payment acknowledgment reply signal for converting said television signal to frequencies appropriate for reception by a conventional unmodified television receiver.

4. A pay television system constructed in accordance with claim 3 in which said first means comprises a signal generating means for generating a periodic sequence of unique combinations of a predetermined number of a plurality of discrete frequencies, each of said combinations corresponding to only one of said plurality of receiving means.

5. A pay television system constructed in accordance with claim 4 in which said periodic sequence of generated signals constitutes said plurality of interrogation signals and in which repetition of individual ones of said interrogation signals in a time substantially less than the period of said sequence constitutes said plurality of payment acknowledgment reply signals.

6. An audience survey system for a pay television system of the type in which a television signal is supplied to a plurality of receiving stations, said survey system comprising:
first means for supplying a plurality of interrogation signals and, in response to program payment acknowledgment signals from said receiving stations, payment acknowledgment replay signals individually coded to correspond to a single one of said receiving stations;
second means in each receiving station individually responsive to its respective interrogation signal for sending back to said first means a signal representative of a program payment acknowledgment and of the program corresponding thereto;
third means also in each receiving station individually responsive to its respective payment acknowledgment reply signal for enabling reception of said television signal by said receiving station;
and coupling means for intercoupling said first means with said second and third means.

7. An audience survey system constructed in accordance with claim 6 in which said first means comprises signal generating means for generating a periodic sequence of unique combinations of a predetermined number of a plurality of discrete frequencies each of said combinations corresponding to only one of said plurality of receiving means.

8. An audience survey system constructed in accordance with claim 7 in which said periodic sequence of generated signals constitutes said plurality of interrogation signals and in which repetition of individual ones of said interrogation signals in a time substantially less than the period of said sequence constitutes said plurality of payment acknowledgment reply signals.

9. An audience survey system constructed in accordance with claim 8 in which is included means responsive to said signal sent from an individual one of said receiving stations for comparing the payment acknowledgment made at said station with the payment acknowledgment required for viewing the pay television program offering selected; means, responsive to the comparison required, for recording data representative of said payment acknowledgment by said station; and means, also responsive to the comparison required, for accumulating the number of said receiving stations viewing current program offerings of said pay television system.

10. An audience survey system constructed in accordance with claim 6 in which said coupling means comprises an interconnecting cable system.

11. Control apparatus for use in a receiving station of a pay television system, comprising:
  means for receiving a plurality of coded interrogation signals and coded payment acknowledgment reply signals and for selecting one of each type signal;
  means responsive to said selected interrogation signal and a program payment acknowledgment made by a viewer, for sending a signal representative of said program payment acknowledgment and of the program corresponding thereto;
  and means responsive to said selected payment acknowledgment reply signal for enabling reproduction of a received pay television program.

12. Control apparatus constructed in accordance with claim 11 in which said receiving means comprises tuned circuit means responsive to a unique combination of a predetermined number of discrete frequencies, said combination representative of a receiving station address.

13. Control apparatus constructed in accordance with claim 12 in which said unique combination serves as both said interrogation signal and said payment acknowledgment reply signal.

14. Control apparatus constructed in accordance with claim 13 in which said unique combination has three discrete frequencies and in which said tuned circuit means comprises three tuned networks corresponding respectively to said three discrete frequencies, said networks coupled to logic circuit means for deriving an output signal when said unique combination is selected.

References Cited

UNITED STATES PATENTS 3,078,337   2/1963   Shanahan _____ 178—5.1

ROBERT L. GRIFFIN, *Primary Examiner.*

H. W. BRITTON, *Assistant Examiner.*